US 8,140,914 B2

(12) United States Patent
Murphy et al.

(10) Patent No.: US 8,140,914 B2
(45) Date of Patent: Mar. 20, 2012

(54) FAILURE-MODEL-DRIVEN REPAIR AND BACKUP

(75) Inventors: Elissa E. S. Murphy, Seattle, WA (US); David A. Nichols, Redmond, WA (US); John D. Mehr, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 226 days.

(21) Appl. No.: 12/484,549

(22) Filed: Jun. 15, 2009

(65) Prior Publication Data

US 2010/0318837 A1 Dec. 16, 2010

(51) Int. Cl.
*G06F 11/00* (2006.01)
(52) U.S. Cl. ...................... 714/47.1; 714/47.3
(58) Field of Classification Search .............. 714/47.1, 714/47.3
See application file for complete search history.

(56) References Cited

U.S. PATENT DOCUMENTS

| | | | |
|---|---|---|---|
| 6,353,902 B1* | 3/2002 | Kulatunge et al. | 714/712 |
| 6,892,236 B1* | 5/2005 | Conrad et al. | 709/224 |
| 7,006,947 B2* | 2/2006 | Tryon et al. | 702/183 |
| 7,155,641 B2* | 12/2006 | Prang et al. | 714/47.1 |
| 7,484,132 B2* | 1/2009 | Garbow | 714/47.2 |
| 2003/0212928 A1* | 11/2003 | Srivastava et al. | 714/47 |
| 2004/0168100 A1 | 8/2004 | Thottan et al. | |
| 2004/0225911 A1* | 11/2004 | Smith | 714/4 |
| 2005/0005202 A1* | 1/2005 | Burt et al. | 714/47 |
| 2005/0289401 A1* | 12/2005 | Goin et al. | 714/47 |
| 2006/0218450 A1* | 9/2006 | Malik et al. | 714/47 |
| 2006/0259832 A1* | 11/2006 | Kumamoto | 714/47 |
| 2007/0079170 A1 | 4/2007 | Zimmer et al. | |
| 2007/0101202 A1* | 5/2007 | Garbow | 714/47 |
| 2008/0141072 A1 | 6/2008 | Kalgren et al. | |
| 2008/0215918 A1* | 9/2008 | Srivastava et al. | 714/24 |
| 2008/0250265 A1* | 10/2008 | Chang et al. | 714/4 |
| 2008/0256397 A1* | 10/2008 | Smith | 714/47 |
| 2009/0083586 A1* | 3/2009 | Warner et al. | 714/47 |
| 2009/0300428 A1* | 12/2009 | Matsumoto et al. | 714/47 |
| 2009/0300430 A1* | 12/2009 | Nissan-Messing et al. | 714/48 |
| 2010/0318837 A1* | 12/2010 | Murphy et al. | 714/4 |

OTHER PUBLICATIONS

Gu, et al., "Online Failure Forecast for Fault-Tolerant Data Stream Processing", retrieved on Jan. 7, 2009 at <<http://www.csc.ncsu.edu/faculty/gu/publications-files/icde08.pdf>>, 3 pages.

Li, et al., "Exploit Failure Prediction for Adaptive Fault-Tolerance in Cluster Computing", retrieved on Jan. 7, 2009 at <<http://ieeexplore.ieee.org/stamp/stampjsp?arnumber=01630866, Proceedings of the Sixth IEEE International Symposium on Cluster Computing and the Grid (CCGRID 2006), 8 pages.

Lu, et al., "Challenges of Long-Term Digital Archiving: A Survey", retrieved on Jan. 7, 2009 at << http://www.ecsl.cs.sunysb.edu/tr/rpe19.pdf, Department of Computer Science, Stony Brook University, 33 pages.

* cited by examiner

*Primary Examiner* — Yolanda L Wilson
(74) *Attorney, Agent, or Firm* — Lee & Hayes, PLLC

(57) ABSTRACT

A predictive failure model is used to generate a failure prediction associated with a node. A repair or backup action may also be determined to perform on the node based on the failure prediction.

19 Claims, 5 Drawing Sheets

FAILURE-MODEL-DRIVEN REPAIR AND BACKUP

BACKGROUND

Users rely on computers to function without interruption or loss of data. Even the smallest interruption can cost users large sums of money, and data loss can deprive users of treasured information.

To prevent computer failures that cause data loss and interruptions of service, computers are often equipped with a number of sensors capable of detecting errors in hardware or software components. For example, computer hard drives are often equipped with sensors capable of detecting disk errors. Other sensors monitor file systems, operating systems, and application programs and indicate the occurrence of errors in those components. Also, computers are often equipped with antivirus software that detects the presence of security exploits which may threaten loss of data and interruption of service.

Once failures occur, the data provided by these sensors and software is used to diagnose the cause or causes of the failures and suggest a remedy. Remedies often include such actions as repairing or replacing the failed hardware or software, or restoring data that is backed up on another computer or storage device. Because these repair and backup actions are performed after the computer has failed, however, some interruption of service or temporary data loss often still occurs.

SUMMARY

Techniques for determining repair or backup actions for nodes based on failure predictions provided by failure models are described. More specifically, a monitoring computing device receives node data from monitored nodes. In some implementations, the node data may be gathered by sensors at each node. The monitoring computing device then uses the node data to build the failure model, and uses the failure model to generate predictions of node failure. Based on these predictions, the monitoring computing device or a monitoring application of a computing device determines preventative repair or backup actions to perform on the nodes and either performs the actions or instructs the nodes to perform the actions. Also, in some implementations, the monitoring computing device compares the failure predictions to subsequent node data to determine whether failures actually occurred. The monitoring computing device may then further build the failure models based on the results of the comparisons.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF DRAWINGS

Non-limiting and non-exhaustive examples are described with reference to the following figures. In the figures, the left-most digit(s) of a reference number identifies the Fig. in which the reference number first appears. The use of the same reference numbers in different figures indicates similar or identical items or features.

DETAILED DESCRIPTION

Figure 1:
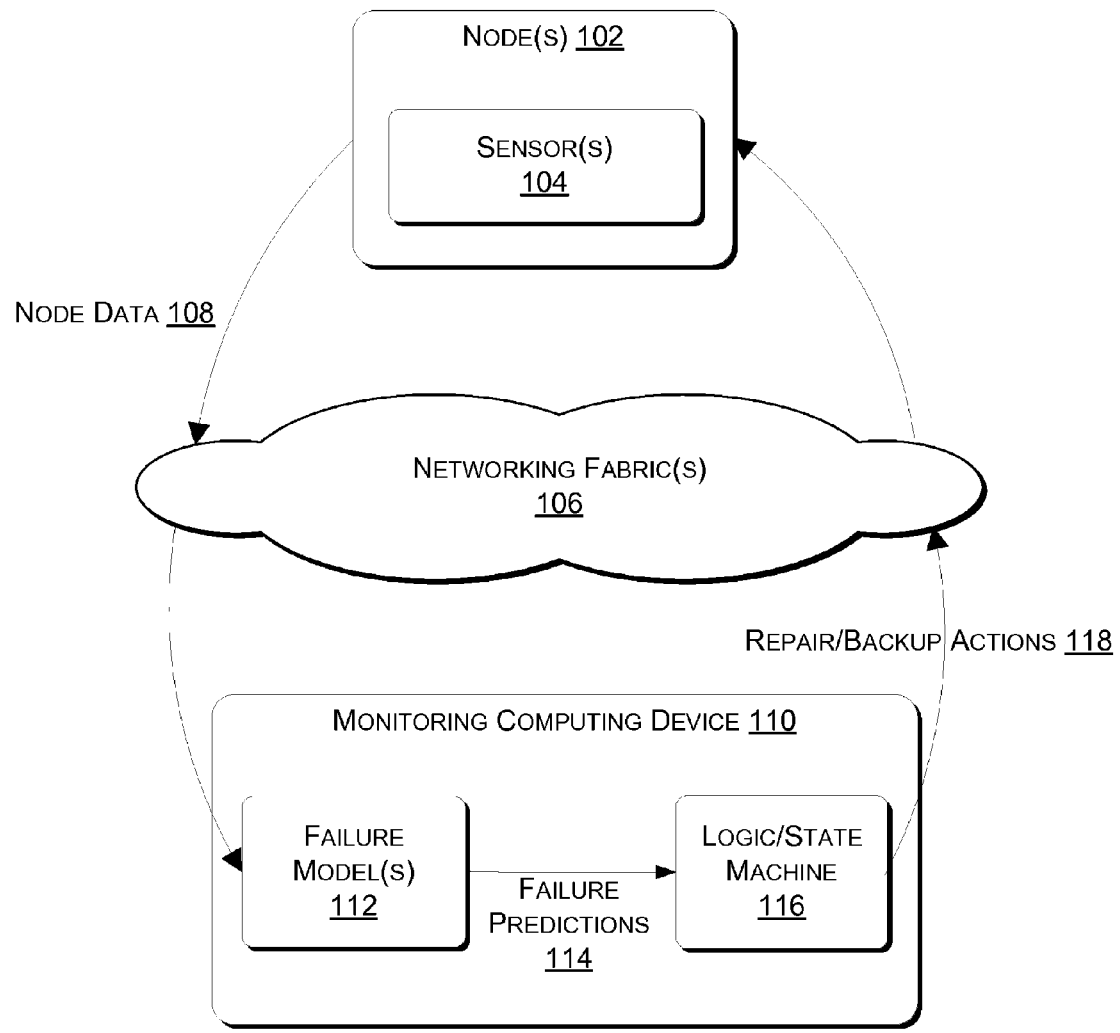
FIG. 1 illustrates an example architecture in which failure prediction and repair or backup action determination are implemented.

This disclosure describes determining repair or backup actions for nodes based on failure predictions provided by failure models. In various implementations, one or more nodes are monitored by a monitoring computing device, which may either be a peer of the other nodes or a server. The nodes provide data, including data gathered by sensors or software components, to the monitoring computing device. The monitoring computing device then uses the received node data to build a failure model, and uses the failure model to predict failures of the nodes. The predictions generated can include hardware and software failures, as well as estimated times that the failures will occur. Based on the failure predictions, the monitoring computing device may also determine repair and/or backup actions for nodes associated with the failure predictions. In that case, the monitoring computing device then performs the repair or backup actions, instructs the nodes to perform the repair or backup actions, or performs the repair or backup actions in conjunction with the nodes. Thus, by predicting failures and performing repairs or backups before those failures actually occur, the monitoring computing device can mitigate or avert the consequences of node failure.

In some implementations, the monitoring computing device may also use the failure predictions to further build and refine the failure model. For example, the monitoring computing device can gather node data received at a time subsequent to the making of the failure predictions and compare the failure predictions to the subsequent node data to determine if node failure(s) actually occurred. This establishes a feedback loop for detecting false positives. The monitoring computing device may then update the failure model based on the results of the comparisons.

The building and refining of the failure model may occur in a training mode and the node data 102 used in that training mode may be training node data. Once the failure model is determined to be sufficiently reliable, it is deployed and used on live node data 102. The failure predictions and results related to live node data 102 may not be used to build and refine the failure model so as to avoid biasing.

In one example implementation, the nodes are a redundant array of inexpensive disks (RAID), such as a RAID 5 configuration. The monitoring computing device may either be one of the nodes, a server, or a device not belonging to the RAID 5 configuration. As described above, a failure model of the monitoring computing device predicts the failure of one or more of the RAID 5 nodes based on data gathered and provided by the RAID 5 nodes. For example, the failure model could predict a hardware failure of one of the nodes. In response to the failure prediction, the monitoring computing device could copy the files and/or processing load of the node associated with the failure prediction to another disk, could remove the node associated with the failure prediction from the RAID 5 configuration, and/or could add the disk with the copied files/processing load to the RAID 5 configuration. The node associated with the failure prediction could then be set aside for maintenance, sent back to the manufacture, or disposed of in some other fashion. By replacing the node associated with the failure prediction before the failure occurs, a substantial amount of processing power and time can be saved by avoiding an entire rebuild of the RAID 5 array after a failure of a disk has already occurred.

Example Architecture

FIG. 1 illustrates an example architecture in which failure prediction and repair or backup action determination may be implemented. As illustrated, the architecture includes one or more nodes 102 having sensors 104. The nodes 102 are communicatively coupled via one or more networking fabrics 106 to a monitoring computing device 110. As shown, the nodes 102 provide node data 108 to the monitoring computing device 110. The node data 108 may be used to build a failure model 112 of the monitoring computing device 110. The monitoring computing device 110 may then use the failure model 112 to generate failure predictions 114 associated with at least one of the nodes 102. Logic 116 of the monitoring computing device 110—including, for example, a state machine—then determines suitable repair or backup actions 118 based on the failure predictions and either performs the repair or backup actions 118 or instructs the nodes 102 to perform the repair or backup actions 118.

In various implementations, the nodes 102 may include any sort of computing devices known in the art, such as, for example, personal computers (PCs), laptops, servers, mainframes, phones, personal digital assistants (PDAs), set-top boxes, and data centers. In one implementation, multiple nodes 102 are implemented on one computing device as multiple hard drives of the computing device. In another implementation, one or more of the nodes 102 is implemented partially on multiple computing devices. In a further implementation, one or more of the nodes 102 are implemented on virtual machines of computing devices. In yet another implementation, the nodes 102 may be elements of a data center or a RAID configuration.

Each node 102 comprises one or more software and/or hardware components as well as at least one sensor 104 for at least one of the hardware/software components or for the environment including the node 102. The sensors 104 may also comprise software and/or hardware and are used to gather performance-related node data 108 from one or more of a storage device (such as disk drives, flash memory, etc.), transmission hardware (such as router/switch components), a file system, an operating system, or an application. In one implementation, the sensors 104 may comprise anti-virus software. For example, the node data 108 gathered by the sensors 104 can include a load associated with at least one of the one or more nodes 102, an indicator from a performance monitor, a temperature associated with at least one of the one or more nodes 102, a context associated with at least one of the one or more nodes 102, a log associated with software failures or software failure rates, and/or a proximity between two or more of the one or more nodes 102 or between at least one of the one or more nodes 102 and another computing device.

In some implementations, the nodes 102 may each include logic (not shown), such as a monitoring agent, capable of retrieving the node data 108 from the sensors 104 and providing the node data 108 to the monitoring computing device 110. The logic can provide the node data 108 in response to a change in a portion of the node data 108, on a pre-determined basis, such as every n units of time, or in response to receiving a request for the node data 108 from the monitoring computing device 110.

As mentioned above, the nodes 102 may provide the node data 108 to the monitoring computing device 110 via one or more networking fabrics 106. In various implementations, the networking fabrics 106 include one or more public and/or private networks, such as private data networks, public data networks, and the Internet. The one or more networks also can include local area networks (LANs), wide area networks (WANs), and/or personal area networks (PANs). In yet other implementations, not illustrated, the nodes 102 may have a direct, point-to-point connection to the monitoring computing device 110 rather than being connected via networking fabrics 106.

In various implementations, the monitoring computing device 110 can be any sort of computing device, such as, for example, a personal computer (PC), a laptop, a server, a mainframe, a phone, a personal digital assistant (PDA), a set-top box, and a data center. In one implementation, the monitoring computing device 110 comprises one of the nodes 102 or a peer of the nodes 102. In another implementation, the monitoring computing device 110 comprises a server and the nodes 102 comprise clients of that server.

As illustrated in FIG. 1, the monitoring computing device 110 includes a failure model 112 and logic/state machine 116. The failure model 112 may actually comprise a plurality of failure models, such as one failure model for each type of node failure. In various implementations, the failure model or models 112 comprise a ruleset. The ruleset in turn has a plurality of rules associating an outcome, such as node failure, with an event, such as a specific load. Each rule can be node-specific or can apply to all or a portion of nodes 102. Also, each rule can have a weight. Collectively, these rules and their weights can be utilized to predict failure for a given node or nodes 102.

In some implementations, the failure model 112 is initially configured with a predetermined set of rules and weights which are experimentally or theoretically determined. In a training mode, before use on live node data, the rules and weights can be deployed upon training node data and adjusted based on the results of the deployment. For example, upon receiving training node data, these rules would each predict an outcome, such as "fail", and the failure model 112 would process these outcomes in view of the weights associated with the rules that produced them to arrive at a failure prediction 114. The failure prediction 114 can predict one or more of a drive failure, a process failure, a controller failure, and an operating system failure. For example, if the failure model 112 comprises a rule set of three rules, one having a weight of five and the other rules each having a weight of one, and only the rule having a weight of five predicts failure, the failure prediction 114 made by that ruleset may still be a node failure (for example, a drive failure). After generating a failure prediction 114, the failure model 112 may compare that prediction 114 to training node data received at a subsequent point in time to determine if the failure actually occurred. If the failure did occur, the failure model 112 may increment the weights of the rules that correctly predicted the failure. If the failure did not occur, the failure model 112 may decrement the weight of the rules that wrongly predicted the failure. The adjusting of rules based on comparisons to subsequent data is only performed on training node data to avoid bias.

In other implementations, the failure model 112 is initially configured with an arbitrary ruleset or no ruleset. In this implementation, in response to receiving node data 108, the failure model 112 adds one or more rules to the ruleset for each datum that is not already associated with a rule. The failure model 112 also initializes a weight for each new rule to a default value. After adding any new rules, the failure model 112 generates a failure prediction 114 using the rules and their weights in the manner described above, and updates the rules by incrementing or decrementing their weights based on comparisons of failure predictions 114 to subsequently received node data 108. Again, updating of rules is only performed in a training mode, before deployment, on training node data to avoid bias.

For example, if the node data 108 includes a temperature value and the ruleset does not include any rules relating to temperature, the failure model 112 can create a plurality of rules associating a "failure" result with exceeding a certain temperature threshold. Each of these rules may have a different threshold. In response to predictive use over time (while in a training mode) and updating of weights of each rule, a number of these new rules will have negligible or no weight, effectively deleting the rules from the ruleset. A number of rules will also correctly predict failure over time and will have their weights increased.

In some implementations, each rule may be associated with a different estimate of time until the failure is going to occur. Continuing with the above example, a ruleset can have multiple rules with the same temperature threshold and same predicted result—failure—but each rule having a different estimated time until the failure is going to occur. Again, in response to predictive use over time (while in a training mode) and updating of weights of each rule, a number of these new rules will have negligible or no weight, effectively deleting the rules from the ruleset and retaining the rules having both the most accurate threshold and estimated time to failure.

In various implementations, the failure model 112 offers a plurality of failure predictions 114 associated with a plurality of failure types, such as a hardware failure, a software failure, etc. To offer the plurality of failure predictions 114, the failure model associates each rule with one or more failure types based on associations of the node data 108 utilized by each rule with a specific sensor or sensors 104 of the nodes 102. For example, the node data 108 could include data associated with a disk error and indicate that the data was provided by a sensor associated with a disk drive of the node. The rules created or provided for evaluating that node data 108 would consequently be associated with disk failures and would offer failure predictions 114 indicating with greater specificity the cause of the node failure. In other implementations, rather than having one failure model 112 offering a plurality of failure predictions, the monitoring computing device 110 may have a plurality of failure models 112 each associated with a different failure type.

In some implementations, when comparing the failure predictions 114 to subsequent node data 108, the failure model 112 updates a score that tracks correct predictions. For example, the score can be a percentage or fraction (such as 55.6% or 5/9) calculated by dividing the number of correct predictions by the number of total predictions. The monitoring computing device 110 can utilize this score to determine whether the failure model has reached a required level of accuracy (e.g., 80%). In some implementations, the monitoring computing device 110 will not utilize the failure predictions 114 of the failure model 112 until the required level of accuracy has been reached.

As mentioned above, the monitoring computing device 110 also includes a logic/state machine 116. In some implementations, logic/state machine 116 includes logic configured to monitor the nodes 102. The logic either requests the node data 108 from the nodes 102—for example, on a pre-determined basis of every n time units—or receives the node data 108 from the nodes 102 without issuing a request for the node data 108. As mentioned above, the nodes 102 can provide the node data 108 each time the node data 108 changes or on a pre-determined basis of every n time units. In one implementation, the logic provides the monitoring agents (mentioned above) to the nodes 102 to enable the nodes 102 to gather node data 108 and provide the node data 108 back to the logic. The logic then provides received node data 108 to the failure model 112 to generate failure predictions 114 and build the failure model 112.

In various implementations, the state machine of logic/state machine 116 may be configured to determine repair or backup actions 118 based on the failure predictions 114. For example, the determined repair or backup actions 118 could include migrating data, replacing hardware, recovering from a backup copy, redirecting a load, or taking a node out of service. In some implementations, the state machine comprises rules and/or definitions associating specific predictions with specific outcomes. In one implementation, these state machine rules and/or definitions may be specific to a certain node 102 or group of nodes 102, applying only to failure predictions 114 associated with those node(s) 102.

Thus, upon obtaining failure predictions 114, the state machine analyzes the failure predictions 114 to determine which failure types the failure predictions 114 are associated with and/or which node(s) 102 the failure predictions 114 are associated with. The state machine then selects rules and/or definitions associated with one or both of the failure type(s) and/or node(s) 102 associated with the failure predictions 114 and selects repair or backup actions 118 based on the outcomes of those rules and/or definitions. In one implementation, the rules and/or definitions also take into account an estimated time to failure of failure predictions 114 and select different repair and/or backup actions 118 based on the estimated time to failure.

In various implementations, the state machine also prioritizes among repair or backup actions 118. The monitoring computing device 110 may have limited processing power or ability to simultaneously handle multiple repair or backup actions 118. Some of these repair or backup actions 118 may in turn be more important than others. Also, some failures may be more serious and/or urgent than others. Thus, based on the type of failure, the estimated time to failure, and/or the type of repair or backup action, the state machine assigns a priority to each determined/selected repair or backup action 118. In some implementations, the repair or backup actions 118 are then queued based on their priorities and are performed in order of their place within the queue. Thus, if the state machine does not have the ability to perform all the repair or backup actions 118, the most important repair or backup actions 118 will still be performed.

In various implementations, the logic/state machine 116 also includes logic for handling the repair or backup actions 118. The logic either performs the repair or backup actions 118 itself, instructs the nodes 102 to perform the repair or backup actions 118, or performs the repair or backup actions 118 in conjunction with the nodes 102 and/or one or more other devices. For example, if the failing node 102 is an element of a data center and the failure type is a disk failure, the logic can remove the node 102 from a listing of data center elements, instruct the node 102 to copy its data and load to another computing device and shut down, instruct the other computing device to receive the data and load and operate as an element of the data center, and add the other computing device to the listing of data center elements.

Figure 2:
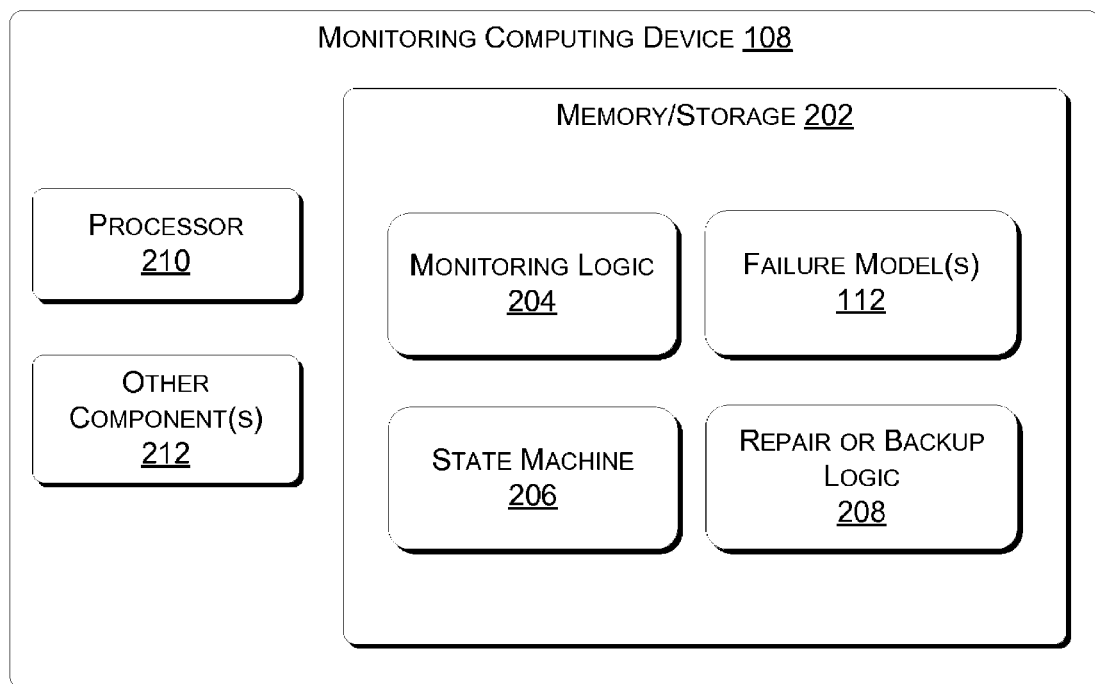
FIG. 2 is a block diagram of selected modules in an example monitoring computing device configured to predict node failures and determine repair or backup actions.
Figure 3:
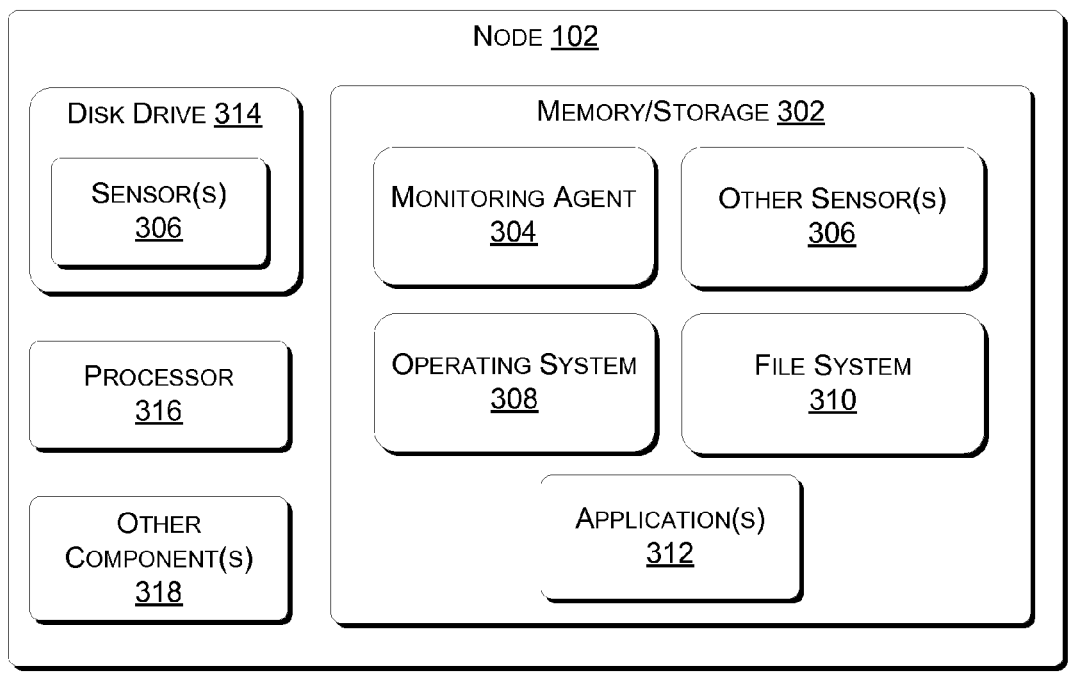
FIG. 3 is a block diagram of selected modules in an example node configured to gather and provide node data and to perform repair or backup actions.

Monitoring computing device 110 and nodes 102 are also illustrated in FIGS. 2 and 3, respectively, and are described in greater detail below in reference to those figures.

Example Monitoring Computing Device

FIG. 2 illustrates example components, modules, and data that may be included the monitoring computing device 110 of FIG. 1. As illustrated, a monitoring computing device 110 includes memory/storage 202. The memory/storage 202 stores monitoring logic 204, failure model(s) 112, a state machine 206, and repair or backup logic 208. The monitoring computing device 110 also includes a processor 210 and, optionally, one or more other components 212.

In some implementations, memory/storage 202 includes one or more of a system memory, removable storage, and/or non-removable storage. Such system memory is volatile (e.g., RAM), non-volatile (e.g., ROM, flash memory, etc.), or some combination of the two. Thus, memory/storage 202 includes volatile and nonvolatile, removable and non-removable media implemented in any method or technology for storage of information, such as computer-readable instructions, data structures, program modules, or other data. System memory, removable storage, and non-removable storage are all examples of computer storage media. Memory/storage 202 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by monitoring computing device 110.

In various implementations, the monitoring logic 204 is configured to perform the monitoring operations of logic/state machine 116 that are describe above in reference to FIG. 1. For example, monitoring logic 204 may request and/or receive node data 108 from nodes 102, may provide a monitoring agent to the nodes 102, and/or may provide the received node data 108 to the failure model(s) 112.

The failure model(s) 112 are also illustrated in FIG. 1 and described above in reference to that figure.

In some implementations, the state machine 206 is configured to perform the repair or backup action selection/determination operations of logic/state machine 116 that are described above in reference to FIG. 1. For example, state machine 206 may receive failure predictions and utilize rules and/or definitions of the state machine 206 to select repair or backup actions 118. The state machine may also prioritize and queue the repair or backup actions 118.

In various implementations, the repair or backup logic 208 is configured to perform the repair or backup implementation operations of logic/state machine 116 that are described above in reference to FIG. 1. For example, repair or backup logic 208 may perform a repair or backup action 118, instruct a node 102 to perform a repair or backup action 118, or perform the repair or backup action 118 in conjunction with a node 102.

In various implementations, processor 210 may comprise any sort of processor or group of processors known in the art. In addition to or instead of a physical processor, processor 210 may also include one or more virtual processors of one or more virtual machines.

In some implementations, monitoring computing device 110 optionally contains other components 212. The other components 212 may include any components known in the art that may be incorporated in a monitoring computing device 110. For example, monitoring computing device 110 may include input device(s) such as keyboard, voice input device, touch input device, etc., output device(s) such as a display, speakers, a printer, etc., and communication means, such as Ethernet ports and wireless cards and associated drivers. These other components 212 are well known in the art and need not be discussed at length here.

Example Node

FIG. 3 illustrates example components, modules, and data in the node(s) 102 of FIG. 1. As illustrated, a node 102 includes memory/storage 302 storing a monitoring agent 304, sensor(s) 306, an operating system 308, a file system 310, and applications 312. The node 102 also includes a disk drive 314, which may also have sensor(s) 306, a processor 316 and, optionally, one or more other components 318.

In some implementations, memory/storage 302 includes a system memory, removable storage, and/or non-removable storage. Such system memory is volatile (e.g., RAM), non-volatile (e.g., ROM, flash memory, etc.), or some combination of the two. Thus, memory/storage 302 includes volatile and nonvolatile, removable and non-removable media implemented in any method or technology for storage of information, such as computer readable instructions, data structures, program modules, or other data. System memory, removable storage, and non-removable storage are all examples of computer storage media. Memory/storage 302 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by node 102.

In various implementations, the monitoring agent 304 is configured to perform the monitoring operations of nodes 102 that are describe above in reference to FIG. 1. For example, the monitoring agent 304 may gather node data 108 from the sensors 306 on a predetermined schedule, such as every n time units, in response to a change in the node data 108, and/or in response to receiving a request for the node data 108. In gathering the node data 108, the monitoring agent 304 notes the sensor 306 which the node data 108 is gathered from and the device component with which the sensor 306 is associated. The monitoring agent 304 also records the time at which the node data 108 is gathered. The monitoring agent 304 can also perform or participate in performing the repair or backup actions 118.

As illustrated, sensors 306 may be independent modules of executable instructions or integrated components of node hardware, such as disk drive 314. Sensors 306 may also be integrated components of software modules as well, such as integrated components of operating system 308, file system 310, or applications 312. Sensors 306 can be configured to monitor sectors of disk drives 314, indexes or tables of file systems 310, registries of operating systems 308, and function calls of applications 312, as well as any other operations, settings, or memory references of node 102. In some implementations, sensors 306 may also monitor devices coupled to node 102, such as thumb drives or remote disk drives and may be integrated in such devices. Also, in some implementations, sensors 306 include antivirus software capable of scanning node 102 for virus activity.

In some implementations, operating system 308, file system 310, applications 312, and disk drive 314 may comprise any operating system, file system, application, and disk drive known in the art.

In various implementations, processor 316 may comprise any sort of processor or group of processors known in the art. In addition to or instead of a physical processor, processor 316 may also include one or more virtual processors of one or more virtual machines. In some implementations, node 102 optionally contains other components 318. The other components 318 may include any components known in the art that may be incorporated in a node 102. For example, node 102 may include input device(s) such as keyboard, voice input device, touch input device, etc., output device(s) such as a display, speakers, a printer, etc., and communication means, such as Ethernet ports and wireless cards and associated drivers. These other components 318 are well known in the art and need not be discussed at length here.

Example Operations

Figure 4:
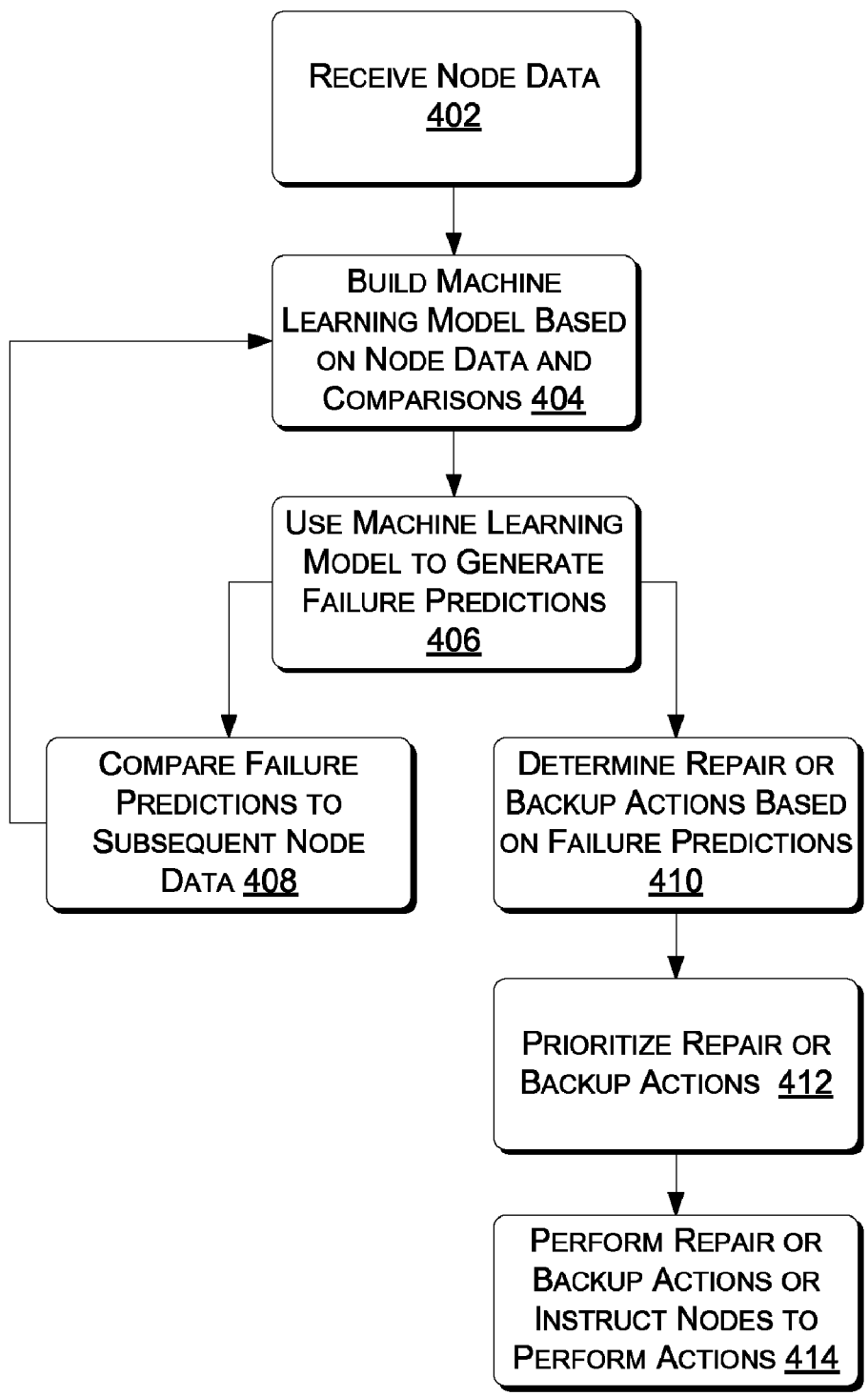
FIG. 4 is a flowchart view of example operations of a monitoring computing device.

FIG. 4 is a flowchart view of example operations of a monitoring computing device. While shown as operations of a monitoring computing device, the operations may instead be implemented in whole or in part on any one or more computing devices, each such computing device being a special purpose computing device configured to perform the operations or portion thereof implemented on that device.

As illustrated, a monitoring computing device first receives node data from one or more nodes, block 402. The monitoring computing device either requests the node data or receives the node data automatically from the one or more nodes.

Upon receiving the node data, the monitoring computing device provides the node data to a failure model of the monitoring computing device, block 404, to build the failure model based on the node data. The monitoring computing device then uses the failure model to generate failure predictions associated with the received node data, block 406.

In some implementations, the monitoring computing device then compares the failure predictions to subsequently received node data, block 408, to determine whether the predicted failure occurred. The monitoring computing device then uses the results of the comparison to further build the failure model, block 404.

As illustrated, the monitoring computing device also determines repair or backup actions, block 410, based on the failure predictions generated by the failure model. In some implementations, the failure model generates multiple failure predictions. When multiple failure predictions are generated, the monitoring computing device prioritizes the repair or backup actions, block 412, and places the repair or backup actions in a queue in order of their priorities, so that the most urgent/important repair or backup actions are performed first.

In various implementations, the monitoring computing device then performs a repair or backup action, instructs a node to perform the action, or performs the action in conjunction with the node, block 414.

Figure 5:
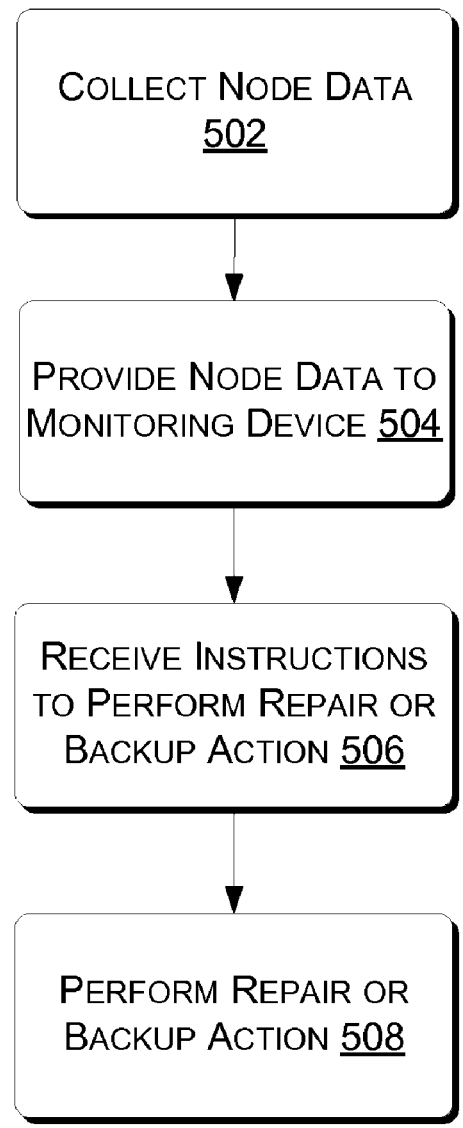
FIG. 5 is a flowchart view of example operations of a node.

FIG. 5 is a flowchart view of example operations of a node. While shown as operations of a node, the operations may instead be implemented in whole or in part on any one or more computing devices, each such computing device being a special purpose computing device configured to perform the operations or portion thereof implemented on that device.

As illustrated, a node first collects node data, block 502. The node data is collected from one or more sensors of the node in response to a request for the node data, in response to a change in the node data, and/or at a pre-determined basis (e.g., once every n time units). After collecting the node data, the node provides the node data to a monitoring computing device, block 504.

In response to providing node data, the node receives instructions to perform a repair or backup action, block 506, from the monitoring computing device in response to a failure model of the monitoring computing device predicting, based on the provided node data, that a failure is likely to occur. The node then performs the repair or backup action, block 508, specified by the instructions to mitigate, work around, or overcome the likely failure.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computing device comprising:
a processor;
a failure model operated by the processor and configured to generate failure predictions associated with a node, the failure model having been built based on node data received from the node and based on comparisons of the failure predictions to other node data received from the node subsequent to those failure predictions to determine whether failures occurred;
a state machine operated by the processor and configured to select repair or backup actions to perform on the node based on the failure predictions, the repair or backup actions being associated with the failure predictions by one or more rules or definitions of the state machine; and
memory coupled to the processor and storing at least one of the failure model or the state machine.

2. The computing device of claim 1, wherein the state machine is further configured to prioritize the repair or backup actions.

3. The computing device of claim 1, wherein the failure model comprises one of a plurality of failure models, each of the failure models being configured to predict a different type of failure.

4. The computing device of claim 1, wherein the node has a monitoring agent to:
gather the node data from one or more sensors of the node,
provide the node data to the computing device, and
receive instructions for performing the repair or backup action.

5. A method comprising:
utilizing, by a computing device, a failure model to generate a failure prediction associated with a node, the failure model built based at least in part on comparisons of failure predictions to node data received from the node at times subsequent to the failure predictions to determine whether failures occurred; and
determining, by the computing device, a repair or backup action to perform on the node based on the failure prediction.

6. The method of claim 5, further comprising building the failure model based at least in part on the node data received from the node.

7. The method of claim 6, further comprising receiving the node data from sensors of the node.

8. The method of claim 5, wherein the failure model comprises one of a plurality of failure models, each of the failure models being configured to predict a different type of failure.

9. The method of claim 5, further comprising performing the repair or backup action or instructing the node to perform the repair or backup action.

10. The method of claim 5, wherein the determining of the repair or backup action is performed by a state machine configured to select a repair or backup action associated with the failure prediction by one or more rules or definitions of the state machine.

11. The method of claim 5, further comprising:
receiving, by the state machine, a plurality of failure predictions for the node and one or more other nodes;
selecting repair or backup actions based on the failure predictions; and
prioritizing the repair or backup actions.

12. The method of claim 5, wherein the node comprises a computing device in a client-server system, a computing device in a peer-to-peer system, or an element of a data center.

13. One or more computer storage devices encoded with instructions that, when executed by a processor of a device, configure the processor to perform acts comprising:
    utilizing a failure model to generate a failure prediction associated with a node, the failure model built based at least in part on comparisons of failure predictions to node data received from the node at times subsequent to the failure predictions to determine whether failures occurred; and
    determining a repair or backup action to perform on the node based on the failure prediction.

14. The computer storage devices of claim 13, wherein the failure prediction predicts a drive failure, a process failure, a controller failure, or an operating system failure and/or includes a predicted failure time.

15. The computer storage devices of claim 13, wherein the acts further comprise building the failure model based on node data received from the node.

16. The computer storage devices of claim 15, wherein the node data includes one or more of a load associated with the node, an indicator from a performance monitor, a temperature associated with the node, a context associated with the node, a log associated with software failures or software failure rates, and a proximity between the node and another node.

17. The computer storage devices of claim 13, wherein the acts further comprise performing the repair or backup action or instructing the node to perform the repair or backup action.

18. The computer storage devices of claim 13, wherein the repair or backup action is one of migrating data, replacing hardware, recovering from a backup copy, redirecting a load, or taking a node out of service.

19. The computer storage devices of claim 13, wherein the acts further comprise utilizing the failure model to generate a plurality of failure predictions and prioritizing repair or backup options based on the plurality of failure predictions.

* * * * *